(12) United States Patent  (10) Patent No.: US 8,692,903 B2
Nomura                     (45) Date of Patent:     Apr. 8, 2014

(54) IMAGING DEVICE, IMAGING METHOD AND COMPUTER READABLE RECORDING MEDIUM STORING PROGRAM FOR PERFORMING THE IMAGING METHOD

(75) Inventor: Kenichiroh Nomura, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 520 days.

(21) Appl. No.: 13/025,726

(22) Filed: Feb. 11, 2011

(65) Prior Publication Data

US 2011/0199508 A1    Aug. 18, 2011

(30) Foreign Application Priority Data

Feb. 17, 2010 (JP) ................. 2010-031990

(51) Int. Cl.
*H04N 9/73* (2006.01)
(52) U.S. Cl.
USPC .............. 348/223.1; 348/224.1; 348/225.1
(58) Field of Classification Search
USPC ............. 348/223.1, 51, 207.1, 208.4, 220.1, 348/222.1, 231.1, 231.5, 239, 251, 294, 348/296, 333.01, 333.02, 340, 362, 224.1, 348/225.1
See application file for complete search history.

(56) References Cited

U.S. PATENT DOCUMENTS

| 2005/0128317 A1 | 6/2005 | Suzuki |
| 2010/0208099 A1 | 8/2010 | Nomura |
| 2010/0231746 A1 | 9/2010 | Nomura |

FOREIGN PATENT DOCUMENTS

| EP | 2 161 938 A2 | 3/2010 |
| JP | 2002-218495 | 8/2002 |
| JP | 2009-38611 | 2/2009 |
| JP | 2009-94997 | 4/2009 |
| JP | 2009-212641 | 9/2009 |
| JP | 2009-212787 | 9/2009 |
| JP | 2009-218641 | 9/2009 |
| JP | 2010-62802 | 3/2010 |

OTHER PUBLICATIONS

Partial Search Report issued Dec. 29, 2011 in European Patent Application No. 11154718.8-2202/2362662.

*Primary Examiner* — Roberto Velez
*Assistant Examiner* — Yih-Sien Kao
(74) *Attorney, Agent, or Firm* — Oblon, Spivak, McClelland, Maier & Neustadt, L.L.P.

(57) ABSTRACT

An imaging device includes an imaging element configured to convert light that has entered from an optical system into an electric signal, and to output the electric signal as an imaging signal, a macro shooting determination section configured to determine whether shooting is macro shooting or not, a low color temperature light source determination section configured to determine whether or not the shooting is performed in a lower color temperature light source based on color information, a first white balance correction coefficient calculator configured to calculate a white balance correction coefficient so as to obtain an image in which a color of the low color temperature light source is added, and a second white balance correction coefficient calculator configured to calculate a white balance correction coefficient so as to obtain an image in which the color of the low color temperature light source is not added in the lower color temperature light source and in the macro shooting.

6 Claims, 7 Drawing Sheets

IMAGING DEVICE, IMAGING METHOD AND COMPUTER READABLE RECORDING MEDIUM STORING PROGRAM FOR PERFORMING THE IMAGING METHOD

PRIORITY CLAIM

The present application is based on and claims priority from Japanese Patent Application No. 2010-031990, filed on Feb. 17, 2010, the disclosure of which is hereby incorporated by reference in its entirety.

BACKGROUND OF THE INVENTION

1. Field of the Invention

The present invention relates to an imaging device having a technique of white balance control, an imaging method and a computer readable recording medium storing a program for performing the imaging method.

2. Description of the Related Art

In recent years, as an imaging device, except for a digital camera for use by professionals in press photography, an imaging device in which white balance correction is intentionally performed has been generally developed. This white balance correction is performed in order to avoid a complete white image when shooting "a white subject" so as to leave in the image an atmosphere in which the shooting is performed in an environment of a low color temperature light source by a red light source such as a light bulb and an incandescent lamp.

However, some photographers prefer to photograph a white subject as a white picture without leaving a color from a light source in an image. Consequently, an imaging device in which a photographer can select whether or not to leave a color of a light source in an image has been also developed (refer to JP2002-218495A).

In addition to the above circumstance according to a photographer's preference, shooting in an environment of a low color temperature light source has a circumstance arising from a subject.

For example, when a subject originally includes warm colors having high intensity, if the subject is shot in a lower color temperature light source and a white balance correction process which leaves a color of a light source in an image is performed, "red" is saturated which deteriorates color reproducibility, so that the quality of the image shot in the environment of the low color temperature light source is deteriorated. If this color reproducibility is deteriorated in a case where a subject is food such as meat or raw fish including high intensity warm colors, an undesirable image quality is obtained, for example, the fresh look of the food is deteriorated. In particular, this image quality becomes a problem in macro shooting and shooting in which a distance to a subject is short.

In this case, there may be a case which does not perform the white balance process if a photographer determines not to leave a color of a light source according to a color of a subject. However, such an operation is complicated and also such a determination is difficult.

SUMMARY OF THE INVENTION

The present invention has been made in view of the above circumstances, and an object of the present invention is to provide an imaging device capable of automatically switching to white balance correction which does not leave a color of a light source when macro shooting or a distance to a subject decreases without performing a complicated operation even in a shooting environment of a low color temperature light source.

One embodiment of the present invention provides an imaging device including an imaging element configured to convert light that has entered from an optical system into an electric signal, and to output the electric signal as an imaging signal, a macro shooting determination section configured to determine whether shooting is macro shooting or not, a low color temperature light source determination section configured to determine whether or not the shooting is performed in a lower color temperature light source based on color information, a first white balance correction coefficient calculator configured to calculate a white balance correction coefficient so as to obtain an image in which a color of the low color temperature light source is added, and a second white balance correction coefficient calculator configured to calculate a white balance correction coefficient so as to obtain an image in which the color of the low color temperature light source is not added in the lower color temperature light source and in the macro shooting, wherein a calculation process of the first white balance correction coefficient calculator and a calculation process of the second white balance correction coefficient calculator are switched based on a result of the macro shooting determination section in the low color temperature light source.

One embodiment of the present invention provides an imaging device including an imaging element configured to convert light that has entered from an optical system into an electric signal, and to output the electric signal as an imaging signal, a subject distance calculator configured to calculate a distance to a subject, a low color temperature light source determination section configured to determine whether or not shooting is performed in a lower color temperature light source based on color information, a white balance correction coefficient calculator configured to calculate a white balance correction coefficient so as to obtain an image in which a color of the low color temperature light source is added, and an adjuster configured to adjust the white balance correction coefficient calculated by the white balance correction coefficient calculator so as to control the image in which the color of the low color temperature light source is added with decreasing the distance to the subject, wherein when the shooting is performed in the low color temperature light source, the color of the light source is adjusted according to the distance to the subject.

One embodiment of the present invention provides an imaging method including a low color temperature light source determination step which determines whether or not shooting is performed in a low color temperature light source based on color information of an imaging signal output from an imaging element which converts light that has entered from an optical system into an electric signal, a macro shooting determination step which determines whether the shooting is macro shooting or not, a first white balance correction coefficient calculation step which calculates a white balance correction coefficient so as to obtain an image in which a color of the low color temperature light source is added, and a second white balance correction coefficient step which calculates a white balance correction coefficient so as to obtain an image in which the color of the low color temperature light source is not added in the macro shooting and in the low color temperature light source, wherein the first white balance correction coefficient calculation step and the second white balance correction coefficient calculation step are switched based on a result of the macro shooting determination step when the shooting is performed in the low color temperature light source.

One embodiment of the present invention provides an imaging method including a low color temperature light source determination step which determines whether or not shooting is performed in a low color temperature light source based on color information of an imaging signal output from an imaging element which converts light that has entered from an optical system into an electric signal, a white balance correction coefficient calculation step which calculates a white balance correction coefficient so as to obtain an image in which a color of the low color temperature light source is added, and an adjusting step which adjusts the white balance correction coefficient calculated by the white balance correction coefficient so as to control the image in which the color of the low color temperature light source is added with decreasing a distance to a subject, wherein when the shooting is performed in the low color temperature light source, the color of the light source is adjusted according to the distance to the subject.

BRIEF DESCRIPTION OF THE DRAWINGS

The accompanying drawings are included to provide further understanding of the invention, and are incorporated in and constitute a part of this specification. The drawings illustrate an embodiment of the invention and, together with the specification, serve to explain the principle of the invention.

DETAILED DESCRIPTION OF THE PREFERRED EMBODIMENT

[Embodiment 1]

Hereinafter, an embodiment of an imaging device, an imaging method and a computer readable recording medium storing a program for performing the imaging method will be described with reference to the drawings.

(Outer Appearance of Digital Camera)

Figure 1A:
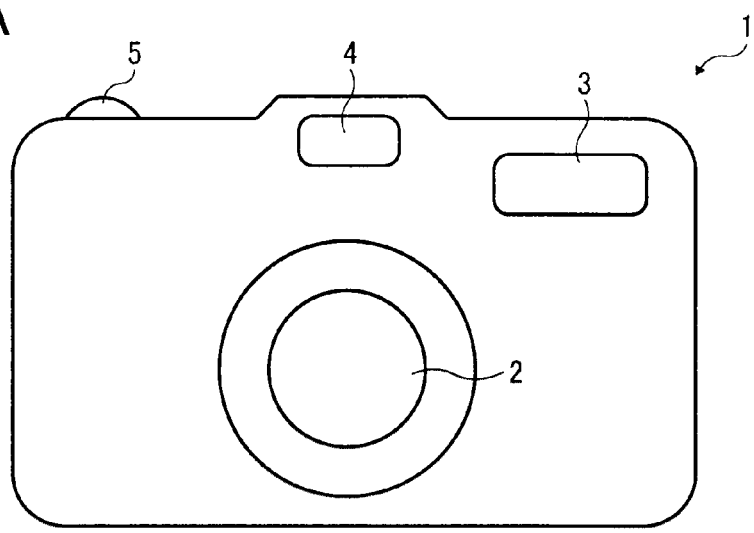
FIG. 1A provides a front view of a digital camera according to an embodiment of the present invention.
Figure 1B:
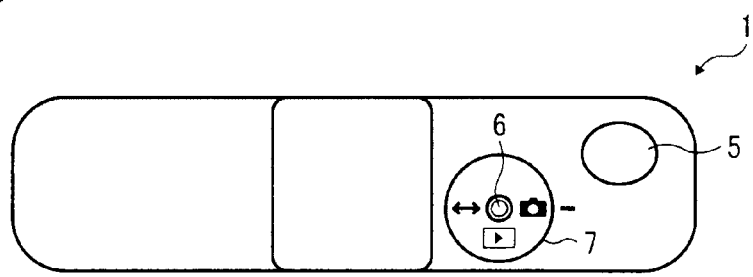
FIG. 1B provides a top view of the digital camera in FIG. 1A.
Figure 1C:
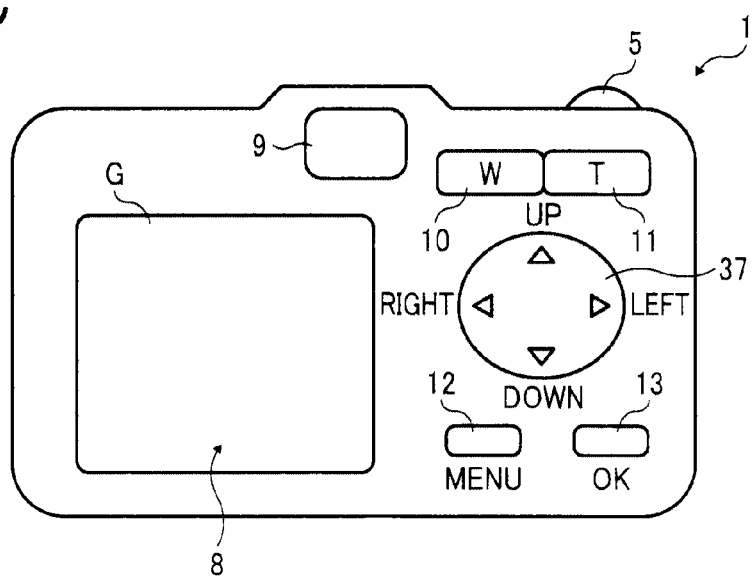
FIG. 1C provides a back view of the digital camera in FIG. 1A.

FIGS. 1A-1C are schematic views each illustrating a digital camera as an imaging device according to the embodiment of the present invention. In FIGS. 1A-1C, reference number 1 denotes a digital camera.

Referring to FIG. 1A, the digital camera 1 includes on the front face thereof a lens barrel unit 2 having an after-described shooting lens system, a strobe light emitter 3 and an optical finder 4.

Next, referring to FIG. 1B, the digital camera 1 includes on the top portion thereof a release button (shutter button) 5, a power source button 6 and a dial 7 for switching shooting and playing.

Then, referring to FIG. 1C, the digital camera 1 includes on the back face thereof a liquid crystal monitor (LCD) 8, an eyepiece lens section 9 of the optical finder 4, a wide angle side zoom (W) switch 10, a telephoto side zoom (T) switch 11, a MENU button 12 and an OK button 13. The digital camera 1 includes in the side face thereof a memory card housing (not shown) for housing a memory card which stores image data.

(System Configuration of Digital Camera)

Figure 2:
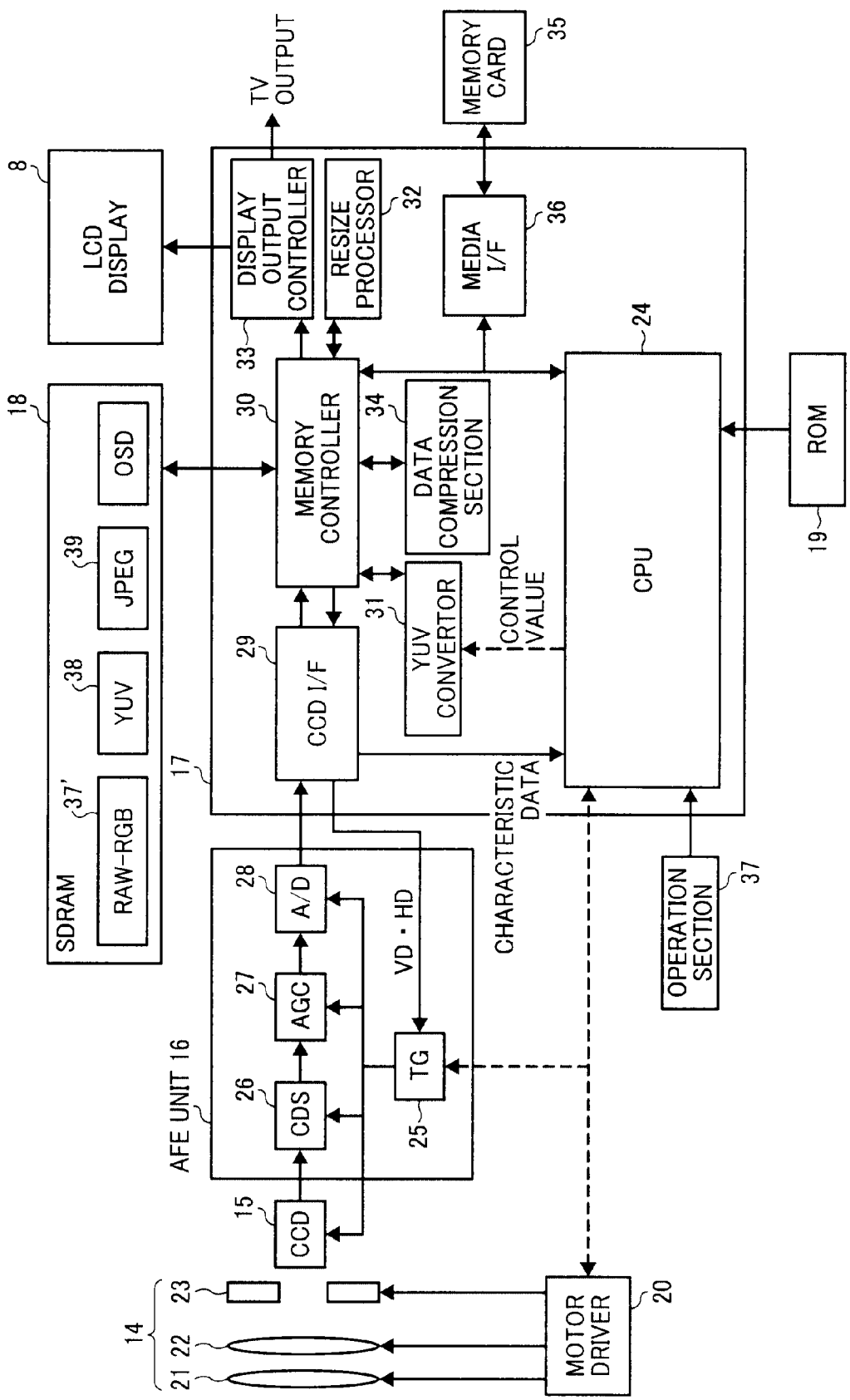
FIG. 2 provides a block diagram illustrating a system configuration of the digital camera.

As illustrated in FIG. 2, the digital camera 1 includes inside thereof an imaging element (for example, CCD) 15 which receives light flux entering via an after-described shooting lens system (optical system) as an image, an analogue front-end section (AFE section) 16 which changes imaging signals (analogue RGE image signals) as electric signals output from the CCD 15 into digital signals, a signal processor 17 which processes the digital signals output from the AFE section 16, an SDRAM 18 which temporarily stores data, a ROM (computer readable recording medium) 19 in which a control program and the like are stored and a motor driver 20.

The lens barrel unit 2 includes a shooting lens system 14 having a zoom lens 21 and a focus lens 22, a not shown aperture stop unit and a mechanical shutter unit 23.

Each driving unit (not shown) of the shooting lens system 14, the aperture stop unit and the mechanical shutter unit 23 is driven by the motor driver 20. The motor driver 20 is controlled by the driving signals from a controller (CPU: computer) 24 of the signal processor 17.

Various imaging elements can be used for the imaging element 15. In this case, the imaging element 15 is a CCD, for example. RGB filters as color decomposition filters are disposed on a plurality of pixels constituting the CCD. Thereby, the electric signals (analogue RGB image signals) corresponding to the three primary colors of RGB are output from the CCD.

The AFE section 16 includes a TG section (timing single generator) 25 which drives the CCD, a CDS section (correlation double sampling section) 26 which samples the electric signals (analogue RGB image signals) output from the CCD, an AGC section (analogue gain controller) 27 which adjusts the gain of the analogue RGB image signals sampled in the CDS section 26, and an A/D convertor 28 which converts the analogue RGB image signals in which the gain is adjusted in the AGC section 27 into original digital signals (RAW-RGB data).

The signal processor 17 outputs a screen horizontal synchronization signal (HD) and a screen vertical synchronization signal (VD) to the TG section 25 of the AFE section 16. This signal processor 17 includes a CCD interface (CCD I/F section) 29 which loads the RAW-RGB data output from the AD convertor 28 of the AFE section 16 corresponding to the synchronization signals HD, VD, a memory controller 30 which controls the SDRAM 18, a YUV convertor 31 which converts the loaded RAW-RGB data into displayable and recordable image data having a YUV format, a resize processor 32 which changes an image size in accordance with a size of image data to be displayed and recorded, a display output controller 33 which controls the display output of the image data, a data compression section 34 for recording the image data with a JPEG format or the like, and a media interface (media I/F) 36 which writes the image data into a memory card 35 or reads the image data written in the memory card 35.

The controller (CPU) 24 controls the entire system of the digital camera 1 according to the control program stored in the ROM 19 based on the input information from the operation section 37.

In FIG. 2, the operation portion 37 includes the release button 5, the power source button 6, the dial 7, the wide angle side zoom switch 10, the telephoto side zoom switch 11, the MENU button 12 and the OK button 13, which are provided in the surface of the digital camera 1 (refer to FIGS. 1A-1C). A predetermined operation instruction signal is input to the controller 24 by the operation of a photographer.

RAW-RGB data 37' loaded into the CCD I/F section 29, YUV data (YUV format image data) 38 converted in the YUV convertor 31 and image data 39 with JPEG format compressed in the data compression section 34 are stored in the SDRAM 18.

The YUV of the YUV data 38 is a format which represents "color" as color difference information of color differences (difference U of brightness data Y and blue component data B and difference V of brightness data Y and red component data R) and brightness data Y.

(Monitoring Operation and Still Image Shooting Operation of Digital Camera)

Next, the monitoring operation and the still image shooting operation of the digital camera 1 will be described. This digital camera 1 performs the still image shooting operation while performing the after-described monitoring operation in the still image shooting mode.

At first, a photographer turns on the power source button 6, and sets the dial 7 to the shooting mode (still image shooting mode), so that the digital camera 1 is activated in the recording mode. If the controller 24 detects that the power source button 6 is turned on and the dial 7 is set to the shooting mode, the controller 24 outputs control signals to the motor driver 20, the lens barrel unit 2 moves to a shootable position, and the CCD 15, the AFE section 16, the signal processor 17, the SDRAM 18, the ROM 19, the liquid crystal monitor (LCD) display) 8 and the like are activated.

If a photographer points the shooting lens system 14 of the lens barrel unit 2 at a subject, the subject image is focused on the light-receiving face of each pixel of the CCD 15 by the image forming light flux which enters via the shooting lens system 14.

The imaging signals (analogue RGB image signal) based on the subject image output from the CCD 15 are input to the A/D convertor 28 via the CDS section 26 and the AGC section 27, and the imaging signals (analogue RGB image signal) are converted into the 12-bit RAW-RGB data by the A/D convertor 28.

This RAW-RGB data is loaded into the CCD I/F section 29 of the single processor 17, and is stored in the SDRAM 18 via the memory controller 30. The RAW-RGB data 37' read from the SDRAM 18 is sent to the YUV convertor 31, and is converted into the YUV data 38 in a displayable format, and then the YUV data 38 is stored in the SDRAM 18 via the memory controller 30.

The YUV data 38 read from the SDRAM 18 via the memory card controller 30 is sent to the liquid crystal monitor (LCD) display 8 via the display output controller 33, and an image (moving image) is displayed.

In the monitoring which displays a shooting image on the liquid crystal monitor (LCD display) 8, one frame is read at 1/30 seconds by a process which thins out the number of pixels by the CCD I/F section 29.

In this monitoring operation, the image (moving image) is displayed on the liquid crystal monitor (LCD display) 8 which functions as an electric finder, and the pressing operation (including half-pressing) of the release button 5 is not performed.

By the display of the image on the liquid crystal monitor (LCD display) 8, the layout for shooting a still image can be confirmed. In addition, the image (moving image) can be displayed on an external TV via a video cable by outputting the image as TV video signals from the display output controller 33.

The CCD I/F section 29 of the single processor calculates an AF (autofocusing) evaluation value, an AE (auto exposure) evaluation value and an AWB (auto white balance) evaluation value from the loaded RAW-RGB data 37'.

The AF evaluation value is calculated from an output integrated value of a high frequency component extraction filter and an integrated value of a brightness difference of adjacent pixels, for example. In the focused state, the edge portion of the subject is clear, so that the high frequency component becomes the highest. Thereby, the AF evaluation value in each focus lens position in the shooting lens system 14 is obtained in the AF operation (auto focusing detection operation), and the AF operation is performed with the maximum point as the auto focus detection position.

The AE evaluation value and the AWB evaluation value are calculated from each integrated value of RGB values in the RAW-RGB data 37'. For example, the screen G of the liquid crystal monitor (LCD display) 8 corresponding to the light-receiving surfaces of the entire pixels of the CCD is equally divided into 256 areas (blocks) (16 areas in horizontal and 16 areas in vertical), and the RGB integration of the each area (block) is calculated.

Then, the controller 24 reads the calculated RGB integrated values, in the AE process, the brightness of each area (block) of the screen G of the liquid crystal monitor (LCD display) 8 is calculated, and the appropriate exposure amount can be determined from the brightness distribution.

Based on the determined exposure amount, the exposure conditions (the number of electric shutters of the CCD, the aperture stop value of the aperture stop unit, the use of the ND filter and the like) are set. In the AWB process, the control value of the AWB (auto white balance) is determined in accordance with the color of the light source of the subject from the RGB distribution. By this AWB process, the white balance in the process which converts into the YUV data in the YUV convertor 31 is set. In addition, the AE process and the AWB process are continuously performed in the monitoring.

In the monitoring operation, if the release button 5 is pressed (from half pressing to full pressing), the still image shooting operation is started, and the AF operation which is an autofocusing position detection operation and the still image recording process are performed.

Namely, if the release button 5 is pressed (from half pressing to full pressing), the focus lens 22 of the shooting lens system 14 is moved by the driving command to the motor driver 20 from the controller 24, and the AF operation with a contrast evaluation method, a so-called hill climbing AF, for example, is performed.

If the AF (autofocusing) target area is an entire area from infinity to close, the focus lens 22 of the shooting lens system 14 moves to each focus position from close to infinity or from infinity to close, and the controller 24 reads the AF evaluation value in each focus position calculated in the CCD I/F section 29. Then, the focus lens 22 is moved to the focus position in which the AF evaluation value of each focus position becomes maximum, and is focused on a subject.

Then, the AE process is performed, and the mechanical shutter unit 23 is closed by the driving command to the motor driver 20 from the controller 24 at the point when the exposure is completed, and the analogue RGB image signals for a still image are output from the CCD. After that, similar to the monitoring, the RGB image signals are converted into the RAW-RGB data 37' by the A/D convertor 28 of the AFE section 16.

This RAW-RGB data 37' is loaded into the CCD I/F section 29 of the signal processor 17, is converted into the YUV data in the YUV convertor 31, and is stored in the SDRAM 18 via the memory card controller 30. Then, this YUV data 38 is read from the SDRAM 18, is converted into a size corresponding to the number of recording pixels in the resize processor 32, and is compressed into the image data with JPEG format in the data compression section 34.

The compressed image data with JPEG format is read from the SDRAM 18 via the memory controller 30 after being written back in the SDRAM 18, and is stored in the memory card 35 via the media I/F 36.

The above description is a summary of the operation of the commercial digital camera 1.

(Embodiment 1)

Figure 4:
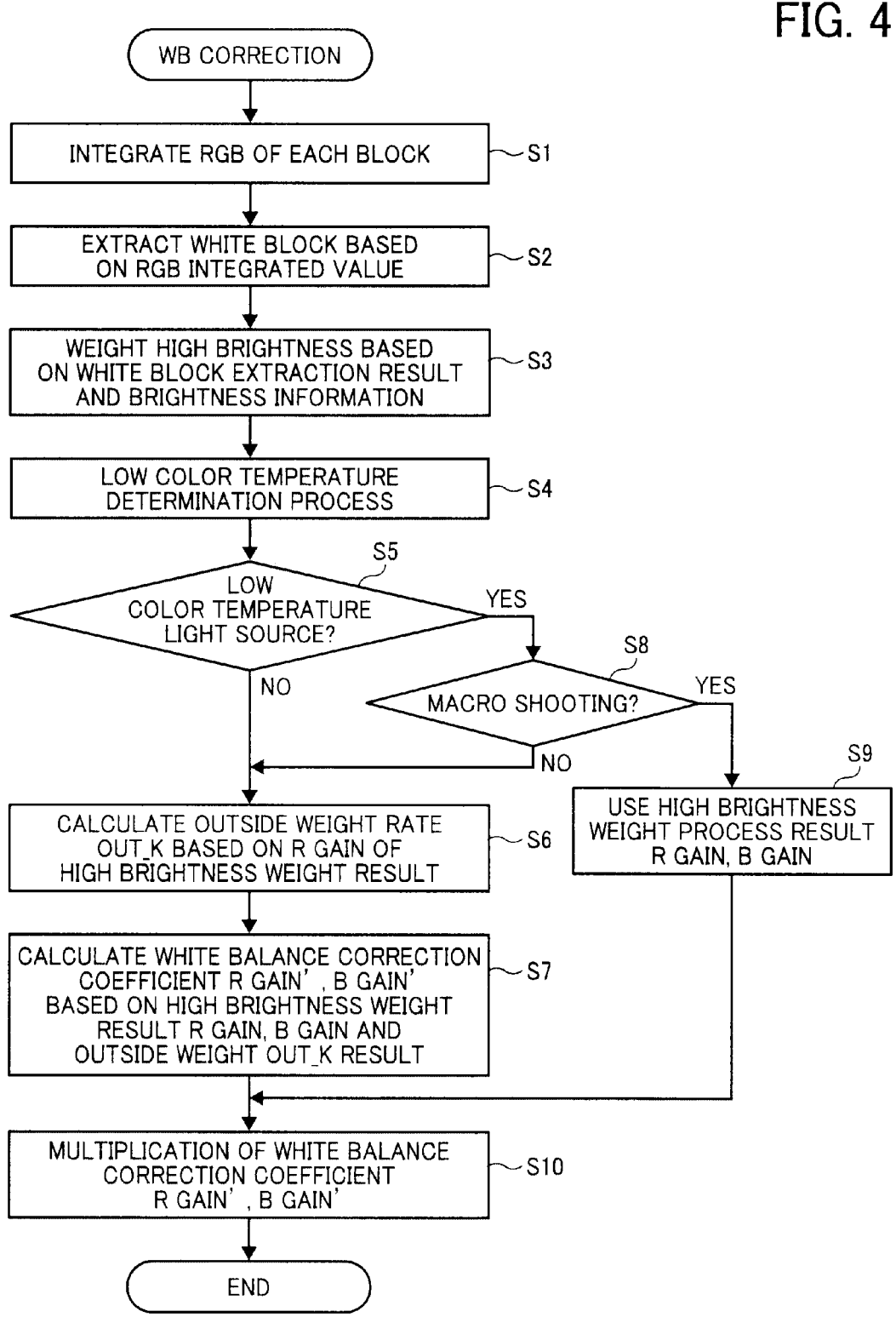
FIG. 4 provides a flow chart describing a function according to Embodiment 1 of the present invention.

Hereinafter, the white balance correction process of the digital camera according to Embodiment 1 of the present invention will be described. FIG. 4 illustrates a flow chart of the white balance correction process of the CCD I/F 29 of the signal processor 17. In addition, this process is performed by transferring information between the CCD I/F 29 and the CPU 24.

Figure 3:
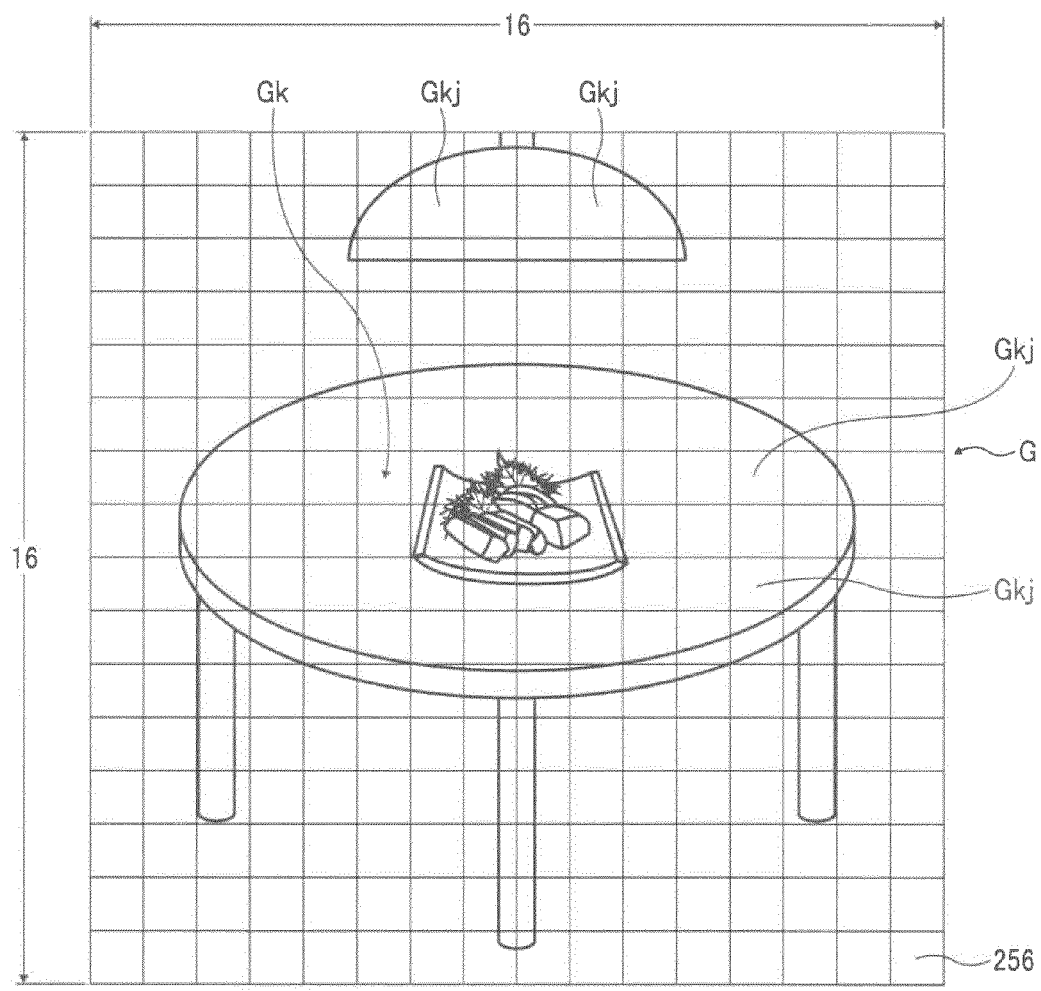
FIG. 3 provides a schematic view illustrating one example which divides a screen.

At first, the RAW-RGB data (image data corresponding to image) 37' is equally divided by blocks, 16 blocks in horizontal×16 blocks in vertical, corresponding to the divided screen G illustrated in FIG. 3.

Each of RGB values is integrated in each divided block, and RGB integrated values (white balance evaluation value) are obtained (S1).

The number of divided blocks is not limited to 16×16=256 (however, n≥4 is satisfied in n-divided blocks).

Also, it is not always necessary to be equally divided; however, it is preferable for all of the divided blocks to have an equal area and the same shape.

Hereinafter, the RGB integrated values will be described in detail.

The RGB integrated values are calculated with respect to each of the divided blocks Gk (k is an integral number from 1 to 256). In this Embodiment 1, since the screen is equally divided into "256", if the CCD 15 comprises about 10000000 pixels, each divided block Gk comprises about 39000 pixels.

Here, the pixel data of each divided block Gk is information of each of RGB components of a subject portion corresponding to a subject image focused on the CCD 15.

In addition, reference number Gk is applied in the divided screen corresponding to the divided block of the CCD 15.

In Embodiment 1, each component of R, G, B is recorded as the 8-bit information (gradation information from 0 to 255). Namely, each of the total number of pixels (about 10000000 pixels÷256=about 39000 pixels) in each of the 256 divided blocks Gk has 8-bit information of the RGB components.

The RGB integrated values (R integrated value, G integrated value, B integrated value) are calculated by adding and averaging R components, G components and B components of the pixels in each of the divided blocks Gk in accordance with the following equation 1.

$$R_{sum} = \sum_{j=1}^{m} R_j / rn$$

$$G_{sum} = \sum_{j=1}^{gn} G_j / gn$$

$$B_{sum} = \sum_{j=1}^{bn} B_j / bn$$

[Equation 1]

$R_{sum}$: R integrated value
$G_{sum}$: G integrated value
$B_{sum}$: B integrated value
rn: the number of R pixels of divided block Gk
gn: the number of G pixels of divided block Gk
bn: the number of B pixels of divided block Gk By calculating based on the equation 1, for example, the following are obtained.
Rsum=78000/9750
Gsum=2925000/19500
Bsum=945750/9750

In Embodiment 1, the ratio of each pixel of R, G, B is R:G:B=1:2:1, and each of the divided blocks comprises R pixel=about 9750 pixels, G pixel=about 1.9500 pixels and B pixel=9750 pixels. In each of the 256 divided blocks, the RGB integrated values (R integrated value, G integrated value, B integrated value) are output as the 8-bit information with respect to each of the R, G, B components.

Regarding white extraction, the RGB integrated values (R integrated value, G integrated value and B integrated value) obtained in each divided block Gk are calculated so as to be converted into R Gain=G integrated value/R integrated value, B Gain=G integrated value/B integrated value. If R Gain=G integrated value/R integrated value and B Gain=G integrated value/B integrated value of the divided block Gk are within the white extraction range on the previously set R gain-B gain coordinates (refer to FIG. 5), the divided block Gk is memorized as a white extraction block (Step 2).

Figure 5:
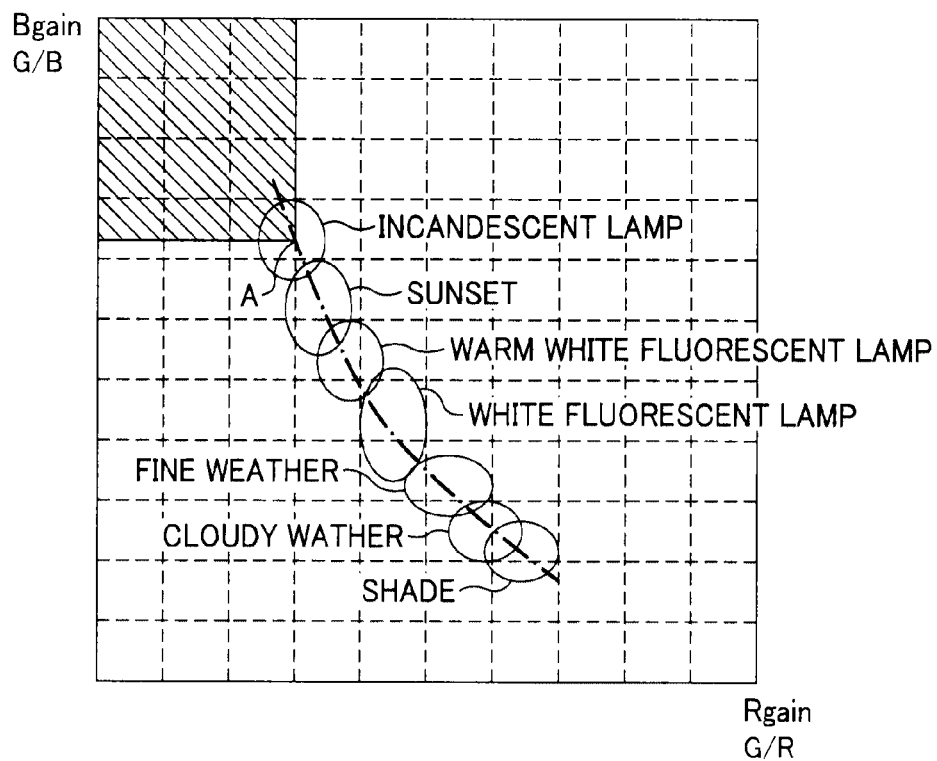
FIG. 5 provides an explanation drawing of R gain-B gain coordinates.

In FIG. 5, the horizontal axis provides R gain, the vertical axis provides B gain and each ellipse illustrates a white detection frame in each color temperature light source. The color temperature from the sun to the shadow is, for example, 5800-3200 k (Kelvin), the color temperature of the sunset and the incandescent lamp is, for example, 3000-1500 k, and the color temperature of the white fluorescent lamp and the warm white fluorescent lamp has a color temperature therebetween.

In addition, R Gain and B Gain are white balance (AWB) evaluation values of the original white extraction block Gkj. Thereby, the white extraction block Gkj is determined from the 256 divided blocks Gk (k=1-256).

In FIG. 3, reference number Gkj is applied in the divided screen Gk corresponding to the white extraction block Gkj of the CCD 15 as a matter of convenience. In this FIG. 3, the images corresponding to the table and the lamp shade as subjects are assumed as white subjects.

Next, a high brightness weighting process is performed on each white extraction block Gkj (Step 3).

In this high brightness weighting process, the weighting by the average brightness Yave of the white extraction block Gkj is performed with respect to R Gain=G integrated value/R integrated value and B Gain=G integrated value/B integrated value of each white extraction block Gkj. The calculation of the high brightness weighting process is performed by the following equation 2.

In addition, the average brightness Yave is calculated by the following equation from R integrated value, G integrated value and B integrated value of the white extraction block Gkj.

$$Yave = Rsum \times 0.299 + Gsum \times 0.587 + Bsum \times 0.114$$

Rsum: R integrated value R integrated value
Gsum: G integrated value G integrated value
Bsum: B integrated value B integrated value $$Rgain = \sum_{j=1}^{n}(GR_j \times Yave_j)/Yave_j$$

$$Bgain = \sum_{j=1}^{n}(GB_j \times Yave_j)/Yave_j \qquad \text{[Equation 2]}$$

GRj: AWB evaluation value (G/R) of white extraction block
GBj: AWB evaluation value (GB) of white extraction block
Yavej: average brightness of white extraction block
n is the total number of white extraction blocks.

In this case, each of R gain and B gain is a white balance gain after the high brightness weighting process.

Moreover, Yavej is average brightness Yave of j-th white extraction block Gkj, GRj is a white balance (AWB) evaluation value (R Gain=G integrated value/R integrated value) of j-th white extraction block Gkj, GBj is a white balance (AWB) evaluation value (B Gain=G integrated value/B integrated value) of j-th white extraction block Gkj, and reference number n is the total number of white extraction blocks Gkj.

If the total number of white extraction blocks Gkj is a predetermined standard or below (for example, 7% or below relative to the total of 256 divided blocks Gk), it is determined whether or not shooting is performed in a lighting environment of a low temperature light source by using the added and averaged value of G integrated value/R integrated value (R gain) of all divided blocks Gk, the added and averaged value of G integrated value/B integrated value (B gain) of all divided blocks Gk, G integrated value/R integrated value (R gain) of each divided block Gk and G integrated value/B integrated value (B gain) of each divided block (Steps 4, 5).

Namely, if the added and averaged value of the G integrated value/R integrated value (R gain) in all divided blocks Gk exists in the center A of the white detection frame of the incandescent lamp illustrated in FIG. 5 or below, the added and averaged value of the G integrated value/B integrated value (B gain) in all divided blocks Gk exists in the shaded portion which is in the center A or above, and 70% or more of G integrated value/R integrated value (R gain) of each divided block Gk and G integrated value/B integrated value (B gain) of each divided block Gk exists in the shaded portion in FIG. 5, it is determined that the shooting is performed in a low color temperature light source.

In this case, the total number of divided blocks Gk is 256, so that it is determined as the low color temperature light source when the total number of divided blocks Gk is 179 or more, for example. The details of this low color temperature light source determination section are described in JP 2009-212641A.

If the shooting is not performed in the low color temperature light source (Step 5), or the shooting is performed in the low color temperature light source and is not macro shooting (Steps 5, 8), the calculation of outside weight rate out_k is performed based on the result of the high brightness weighting process (Step 6).

The macro shooting is determined based on the focus position of the focus lens 22 and the zoom position of the zoom lens 21.

Here, the outside weight is calculated by weighting and averaging the results (R gain, B gain) of the high brightness weighting process and the outside reference gains, R gain", B gain".

Figure 6:
FIG. 6 provides a view illustrating one example of outside weight rates according to Embodiment 1 of the present invention.

The outside weight rate out_k is calculated by the white balance evaluation value R gain after the high brightness weighting process of the white extraction block Gkj as illustrated in FIG. 6. As illustrated in FIG. 6, the outside weight rate out_k is increased with decreasing the white balance evaluation value R gain after the high brightness weighting process, namely, with a decrease in the color temperature.

Moreover, the outside weight rate is decreased with an increase in the white balance evaluation value R gain after the high brightness weighting process of the white extraction block Gkj, namely, with increase in the color temperature.

This outside weight rate out_k has a role which increases the weight of the outside reference gains, R gain", B gain" with a decrease in the color temperature, so as to leave the color of the light source.

The outside reference gains, R gain" and B gain" are white balance (WB) correction coefficients in which the color temperature becomes the most suitable temperature of 5200-5500K, for example, in the outside. In addition, the white balance (WB) correction coefficients are not limited to the color temperature of 5200-5500K.

Next, the white balance correction coefficients R gain', B gain' are calculated (outside weight process) by the following equation 3 from the result of the high brightness weighting process R gain, B gain and the outside weight rate out_k (Step 7).

$$Rgain' = Rgain'' \times out\_k + Rgain \times (1 - out\_k)$$

$$Bgain' = Bgain'' \times out\_k + Bgain \times (1 - out\_k) \qquad \text{[Equation 3]}$$

R gain': white balance correction coefficient
B gain': white balance correction coefficient
R gain: high brightness weighting result
B gain: high brightness weighting result
R gain": outside reference gain
B gain" outside reference gain
out_k: outside weight rate If the shooting is performed in the low color temperature light source, and the shooting is performed in the macro shooting (Steps 5, 8), the results of the high brightness weighting process R gain, B gain are used as the white balance (WB) correction coefficients R gain'=R gain, B gain'=B gain (Step 9).

Next, each R data of each pixel of the entire screen is multiplied by the WB correction coefficient R gain' and each B data of each pixel of the entire screen is multiplied by the WB correction coefficient B gain' (Step 10).

Thereby, the white balance WB, which leaves the warm feel of the light source in the low color temperature light source, can be set. Accordingly, in the macro shooting, when shooting food and drink, a preferable white balance WB can be set without saturating the redness of meat and raw fish.

On the other hand, when the shooting is performed in the low color temperature light source and the shooting is not performed in the macro photographing (Steps 5, 6), the white balance WB is set by using the white balance correction coefficients R gain', B gain' obtained by the high brightness weighting process results R gain, B gain and the outside weight rate out_k. Therefore, the white balance WB which leaves the color of the light source can be set in the low color temperature condition.

In addition, these processes are performed by programs which are read by the computer provided in the imaging device having an image process function. These processes include the low color temperature light source determination step (Steps 4, 5, in FIG. 4) which determines whether or not the shooting is performed in the low color temperature light source based on the color information of the imaging signal output from the imaging element which converts the light that has entered from the optical system into the electric signal, the macro shooting determination step (Step 8, in FIG. 4) which determines whether the shooting is the macro shooting or not, the first white balance correction coefficient calculation step (Step 7, in FIG. 4) which calculates the white balance correction coefficient so as to obtain the image in which the color of the low color temperature light source is added, the second white balance correction coefficient step (Step 9, in FIG. 4) which calculates the white balance correction coefficient so as to obtain the image in which the color of the low color temperature light source is not added in the macro shooting and in the low color temperature light source, and the switching step (Steps 5, 8 in FIG. 4), which switches the first white balance correction coefficient calculation step and the second white balance correction coefficient calculation step based on the result of the macro shooting determination step when the shooting is performed in the low color temperature light source. These programs are stored in the ROM 19 which is a computer readable recording medium for performing the white balance calculation process.

It is desirable for the program which performs the low color temperature light source determination process to be a program which can determine whether or not it is a low color temperature light source based on color information and brightness information. It is also desirable for the program which performs the macro shooting determination process program to be a program which can perform the determination as to whether or not it is macro shooting by the focus position and the zoom position.

(Embodiment 2)

Figure 7:
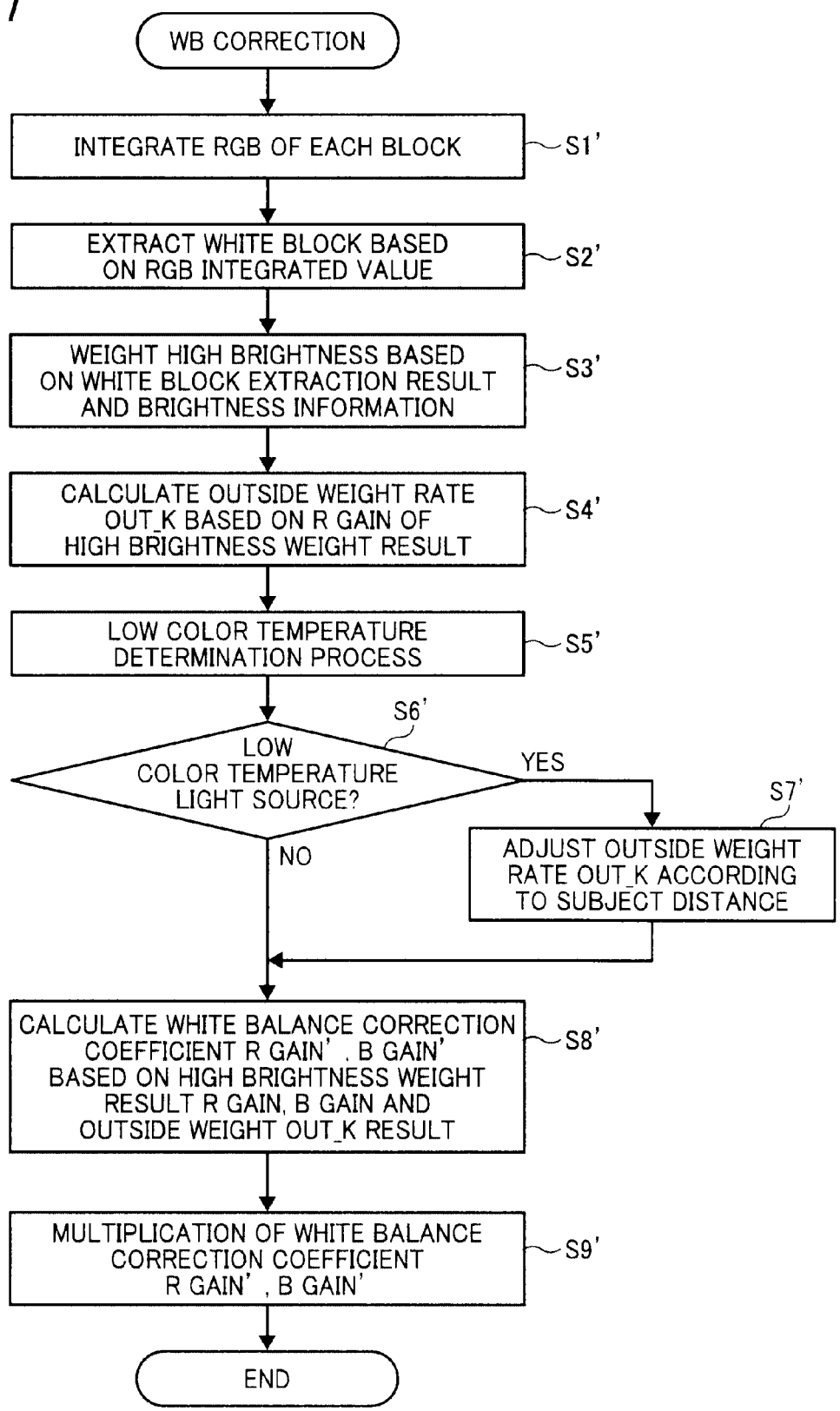
FIG. 7 provides a flow chart describing a function according to Embodiment 2 of the present invention.

FIG. 7 is a flow chart illustrating the calculation process of the white balance correction coefficients R gain', B gain' according to Embodiment 2 of the present invention.

In Embodiment 1, the calculation process of the white balance correction coefficients R gain', B gain' is switched according to the macro shooing or shooting except for the macro shooting.

In Embodiment 2, the color of the light source is adjusted based on the distance from the digital camera to the subject and the lower color temperature light source shooting environment.

Steps 1'-3' are processes which are the same as Steps 1-3 in Embodiment 1 (refer to FIG. 4).

Since Step 4' is a process which is the same as the process of Step 6 (refer to FIG. 4) in Embodiment 1 and Step 5' is a process which is the same as the process of Step 4 (refer to FIG. 4) in Embodiment 1, the detailed descriptions thereof will be omitted. If it is determined that the shooting is performed in the low color temperature light source environment in Step S6' (Yes), the outside weight rate out_k is adjusted according to the distance to the subject by using the outside weight control coefficient out_k' illustrated in FIG. 8 (S. 7').

The value in which the outside weight rate out_k before adjustment is integrated by the outside weight control coefficient out_k' is set to the outside weight rate out_k after adjustment.

Outside weight rate out_k after adjustment=Outside weight rate out_k before adjustment×Outside weight control coefficient out_k'.

Since the outside weight control coefficient out_k' is large when a distance to the subject is short, and is a coefficient which linearly decreases as the distance to the subject is increased, the value of the outside weight rate out_k which is used for leaving the color of the light source in the low color light source environment is decreased as the distance to the subject is decreased. Therefore, it is adjusted not to leave the color of the light source as the distance to the subject is decreased.

Figure 8:
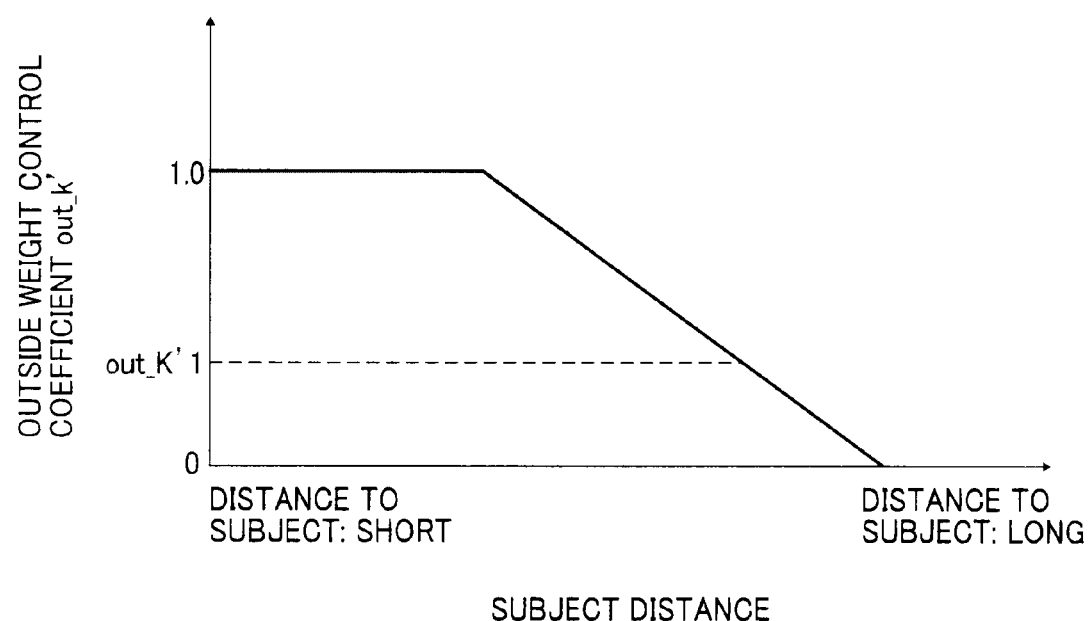
FIG. 8 provides a view illustrating one example of outside weight suppression coefficients according to Embodiment 2 of the present invention.

For example, when the outside weight rate out_k before adjustment is out_k1 illustrated in FIG. 6 and the outside weight control coefficient out_k' illustrated in FIG. 8 is out_k'1, the outside weight rate out_k after adjustment is obtained by out_k=out_k1×out_k'1, and the white balance correction coefficients R gain', B gain' are obtained according to the equation 2 by using the outside weight rate out_k after adjustment.

Namely, the white balance correction coefficients R gain', B gain' are calculated (outside weight process) (S. 8') according to the equation 2 from the high brightness weighting process results R gain, B gain and the outside weight rate out_k after adjustment.

Next, the R component data of each pixel of the entire screen is multiplied by the WB correction coefficient R gain' and the B component data of each pixel of the entire screen is multiplied by the WB correction coefficient B gain' (Step S9').

Therefore, the white balance WB which leaves the warm feel of the light source can be set in the low color temperature light source environment. On the other hand, in the shooting with a short distance to a subject such as food and drink, a preferable white balance WB can be set without saturating the redness of food such as meat and raw fish.

Programs which can perform the white balance calculation process according to the subject distance can be used for these processes in order to perform the processes which adjust the color of the light source according to the subject distance when the low color temperature light source is used.

In addition, these processes include the low color temperature light source determination step which determines whether or not shooting is performed in the low color temperature light source based on the color information of the imaging signal output from the imaging element which converts the light that has entered from the optical system into the electric signal, the white balance correction coefficient calculation step which calculates the white balance correction coefficient so as to obtain the image in which the color of the low color temperature light source is added, and the adjusting step which adjusts the white balance correction coefficient calculated by the white balance correction coefficient calculation step so as to control the image in which the color of the low color temperature light source is added with decreasing the distance to a subject.

According to the embodiment of the present invention, it is possible to automatically switch to the white balance correction which does not leave the color of the light source with the macro shooting or decreasing the distance to the subject without performing a complicated operation even in the shooting environment of the low color temperature light source.

Although the embodiment of the present invention has been described above, the present invention is not limited thereto. It should be appreciated that variations may be made in the embodiment described by persons skilled in the art without departing from the scope of the present invention.

What is claimed is:

1. An imaging device, comprising: an imaging element configured to convert light that has entered from an optical system into an electric signal, and to output the electric signal as an imaging signal; a macro shooting determination section configured to determine whether shooting is macro shooting or not; a low color temperature light source determination section configured to determine whether or not the shooting is performed in a lower color temperature light source based on color information; a first white balance correction coefficient calculator configured to calculate a white balance correction coefficient so as to obtain an image in which a color of the low color temperature light source is added; and a second white balance correction coefficient calculator configured to calculate a white balance correction coefficient so as to obtain an image in which the color of the low color temperature light source is not added in the lower color temperature light source and in the macro shooting, wherein a calculation process of the first white balance correction coefficient calculator and a calculation process of the second white balance correction coefficient calculator are switched based on a result of the macro shooting determination section in the low color temperature light source.

2. The imaging device according to claim 1, wherein the macro shooting determination section is configured to determine whether or not the shooting is the macro shooting according to a focus position and a zoom position.

3. The imaging device according to claim 1, wherein the low color temperature light source determination section is configured to determine whether or not the shooting is performed in the low color temperature light source based on color information and brightness information.

4. An imaging method, comprising: a low color temperature light source determination step which determines whether or not shooting is performed in a low color temperature light source based on color information of an imaging signal output from an imaging element which converts light that has entered from an optical system into an electric signal; a macro shooting determination step which determines whether the shooting is macro shooting or not; a first white balance correction coefficient calculation step which calculates a white balance correction coefficient so as to obtain an image in which a color of the low color temperature light source is added; and a second white balance correction coefficient step which calculates a white balance correction coefficient so as to obtain an image in which the color of the low color temperature light source is not added in the macro shooting and in the low color temperature light source, wherein the first white balance correction coefficient calculation step and the second white balance correction coefficient calculation step are switched based on a result of the macro shooting determination step when the shooting is performed in the low color temperature light source.

5. The imaging method according to claim 4, wherein the macro shooting determination step determines whether the shooting is the macro shooting or not based on a focus position and a zoom position.

6. The imaging method according to claim 4, wherein the low color temperature light source determination step determines the low color temperature light source based on color information and brightness information.

* * * * *